United States Patent
Yu et al.

(10) Patent No.: US 11,180,589 B2
(45) Date of Patent: Nov. 23, 2021

(54) METALLOCENE CATALYST COMPOUND FOR PRODUCTION OF POLYOLEFIN RESIN OR METHOD OF PREPARING SAME

(71) Applicant: DL Chemical CO., LTD., Seoul (KR)

(72) Inventors: Seung Tack Yu, Hwaseong-si (KR); Yong Kim, Gwangju (KR); Dong Sik Park, Daejeon (KR); Yong Jae Jun, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 46 days.

(21) Appl. No.: 16/801,534

(22) Filed: Feb. 26, 2020

(65) Prior Publication Data

US 2020/0291150 A1    Sep. 17, 2020

(30) Foreign Application Priority Data

Mar. 12, 2019 (KR) .................. 10-2019-0028109

(51) Int. Cl.
*C08F 4/64* (2006.01)
*C08F 210/16* (2006.01)

(52) U.S. Cl.
CPC ........ *C08F 210/16* (2013.01); *C08F 4/64072* (2013.01); *C08F 2420/04* (2013.01)

(58) Field of Classification Search
CPC .......................... C08F 4/6592; C08F 210/16
See application file for complete search history.

(56) References Cited

U.S. PATENT DOCUMENTS

| 4,874,880 A | 10/1989 | Miya et al. |
| 5,324,800 A | 6/1994 | Welborn, Jr. et al. |
| 5,889,128 A | 3/1999 | Schrock et al. |
| 6,610,806 B2 | 8/2003 | Schrock et al. |
| 2015/0166699 A1 | 6/2015 | Kao et al. |

FOREIGN PATENT DOCUMENTS

| CN | 103772439 A | 5/2014 |
| DE | 26 08 933 A1 | 9/1977 |
| DE | 30 07 725 A1 | 9/1981 |
| EP | 0 129 368 A1 | 12/1984 |
| JP | 2001-520696 A | 10/2001 |
| JP | 2009-502781 A | 1/2009 |
| KR | 2002-0063233 A | 8/2002 |
| RU | 2 233 845 C2 | 8/2004 |
| RU | 2 270 203 C2 | 2/2006 |

(Continued)

OTHER PUBLICATIONS

Communication dated Aug. 7, 2020 by the European Patent Office in application No. 20156262.6.

(Continued)

*Primary Examiner* — Caixia Lu

(74) *Attorney, Agent, or Firm* — Sughrue Mion, PLLC

(57) ABSTRACT

The present invention relates to a novel metallocene catalyst compound for the production of a polyolefin resin having a high molecular weight and a wide molecular weight distribution or a method of preparing the same, and more particularly to a metallocene catalyst compound using a ligand containing a Group 15 or 16 element having a bulky substituent or a method of preparing the same. The present invention provides a novel metallocene catalyst compound represented by Chemical Formula 1 below.

$(L^1)\{(N-L^2)Z^1(Y)Z^2(N-L^3)\}(X)M$     [Chemical Formula 1]

9 Claims, 1 Drawing Sheet

(56) References Cited

FOREIGN PATENT DOCUMENTS

| RU | 2 510 646 C2 | 4/2014 |
|---|---|---|
| WO | 2006/102119 A2 | 9/2006 |
| WO | 2006/102119 A3 | 9/2006 |
| WO | 2008/084931 A1 | 7/2008 |
| WO | 2018/064035 A1 | 4/2018 |

OTHER PUBLICATIONS

Communication dated Sep. 21, 2020 by the European Patent Office in application No. 20156262.6.

Han et al., "Bridged Dinuclear Tripodal Tris(amido)phosphane Complexes of Titanium and Zirconium as Diligating Building Blocks for Organometallic Polymers", European Journal of Inorganic Chemistry, 2008, pp. 471-482.

Guérin et al., "Synthesis, Structure, and Reactivity of Zirconium Alkyl Complexes Bearing Ancillary Pyridine Diamide Ligands", Organometallics, vol. 17, 1998, pp. 5172-5177.

Communication dated May 5, 2020 by the Intellectual Property Agency Under The Ministry of Justice of the Republic of Uzbekistan in application No. IAP 2020 0104.

Communication dated Apr. 23, 2020 by the Federal Institute of Industrial Property of Russia in application No. 2020108196/04.

Communication dated Jun. 15, 2020 by the Federal Institute of Industrial Property of Russia in application No. 2020108196/04.

Liang L.-C. et al, "Synthesis of Group 4 Complexes that Contain the Diamidoamine Ligand, $[(2,4,6\text{-Me}_3\text{C}_6\text{H}_2\text{NCH}_2\text{CH}_2)_2\text{NR}]^{2-}$-$([\text{Mes}_2\text{N}_2\text{NR}]^{2-}$;R=H or $CH_3$), and Polymerization of 1-Hexene by Activated $[\text{Mes}_2\text{N}_2\text{NR}]\text{ZrMe}_2$ Complexes", J. Am. Chem. Soc., 1999, vol. 121, No. 24, p. 5797-5798.

Morgan A.R. et al, "Exploring alternative synthetic routes for the preparation of five-coordinate diamidoamine group 4 metal complexes", Organometallics, 2005, vol. 24, No. 22, p. 5383-5392.

Communication dated Jul. 23, 2020 by the Korean Intellectual Property Office in application No. 10-2019-0028109.

Walter Kaminsky, et al, "Bis(cyclopentadienyl)zirkon-Verbindungen und Aluminoxan als Ziegler-Katalysatoren für die Polymerisation und Copolymerisation von Olefinen", Makromol. Chem., Rapid Commun. 1983, pp. 417-421, vol. 4.

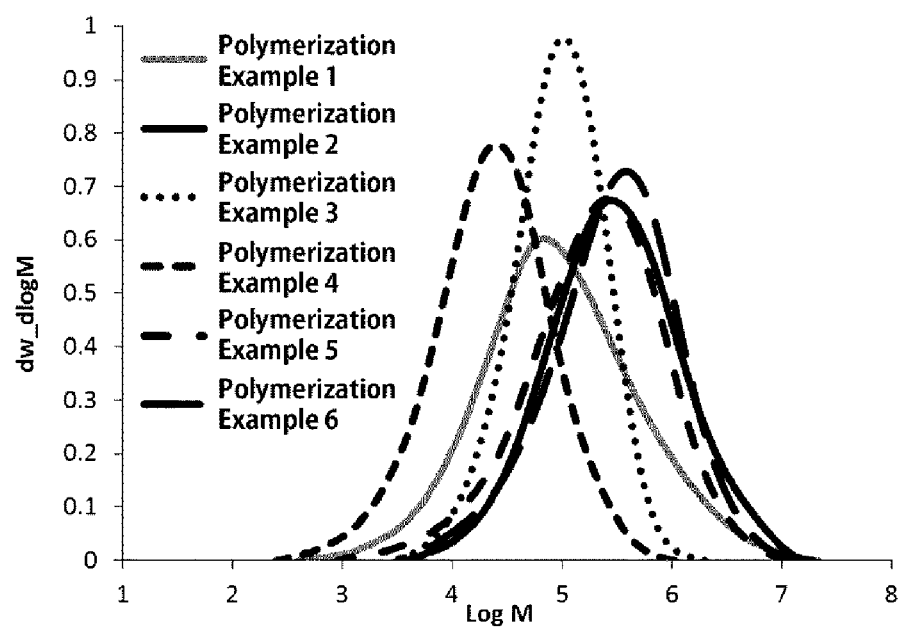

METALLOCENE CATALYST COMPOUND FOR PRODUCTION OF POLYOLEFIN RESIN OR METHOD OF PREPARING SAME

CROSS-REFERENCE TO RELATED APPLICATIONS

This application is based on and claims priority from Korean Patent Application No. 10-2019-0028109, filed on Mar. 12, 2019 with the Korean Intellectual Property Office, the disclosure of which is incorporated herein in its entirety by reference.

BACKGROUND OF THE INVENTION

1. Technical Field

The present invention relates to a novel metallocene catalyst compound for the production of a polyolefin resin having a high molecular weight and a wide molecular weight distribution or a method of preparing the same, and more particularly to a metallocene catalyst compound using a ligand containing a Group 15 or 16 element having a bulky substituent or a method of preparing the same.

2. Description of the Related Art

The most common polymers in daily life are polyolefin-based polymers, and conventional polyolefins are most often produced using Ziegler-Natta catalysts and chromium-based catalysts. However, polymers produced using Ziegler-Natta catalysts and chromium-based catalysts, which are multi-site catalysts, have wide molecular weight distribution and non-uniform composition distribution of comonomers, making it difficult to impart desired properties thereto.

Since W. Kaminsky's discovery of ethylene polymerization using a metallocene catalyst, which is a homogeneous single-site catalyst, in the 1980s, thorough research thereto has been carried out. Metallocene is a bis(cyclopentadienyl) metal, which is a new organometallic compound having a sandwich structure, as a compound in which a cyclopentadienyl ligand is coordination-bonded to a transition metal or a transition metal halogen compound. Unlike the Ziegler-Natta catalysts, metallocene catalysts are single-site catalysts, and thus polymers produced using the metallocene catalysts have a narrow molecular weight distribution, and have an advantage of ease of adjustment of molecular weight, stereoregularity, crystallinity and comonomer reactivity depending on the structure of the catalyst and ligand, making it easy to control the properties of a desired polymer.

As the metallocene catalyst, for example, German Patent Nos. 2,608,933 and 3,007,725 disclose the use of a metallocene compound composed of a Group 4 transition metal of the periodic table such as zirconium, titanium, hafnium, etc. and a ligand having a cyclopentadiene-based structure, as an olefin polymerization catalyst along with an activator such as methylaluminoxane, etc. Examples of the ligand compound having a cyclopentadiene-based structure include cyclopentadiene, indene, fluorene, substituted cyclopentadiene, substituted indene and substituted fluorene.

Various kinds of cyclopentadiene-based metallocene compounds may be used in catalyst systems for olefin polymerization, and changes in the chemical structure of cyclopentadiene-based metallocene have been known to have a significant effect on the compatibility of metallocene as the polymerization catalyst.

For example, the size and position of the substituent attached to a cyclopentadienyl ring have a great influence on the activity of the catalyst, the stereospecificity of the catalyst, the safety of the catalyst, and the properties of the polymer that may be obtained through a polymerization reaction. Recently, it has been found that a catalyst system composed of substituted cyclopentadiene-based metallocene including zirconium as a transition metal and methylaluminoxane has high activity in olefin polymerization, as is disclosed in many documents, including European Patent No. 129,368, U.S. Pat. Nos. 4,874,880, 5,324,800, Makromol. Chem. Rapid Commun., 4, 417(1983) and elsewhere.

International Publication No. 2008/084931 discloses a half-metallocene compound coordinated with a monocyclopentadienyl ligand to which an amido group is introduced. This half-metallocene catalyst compound has superior thermal stability and is easy to use in a solution polymerization process, and a polyolefin produced using the same has a very high molecular weight and high comonomer content, but the molecular weight distribution thereof is very narrow, undesirably causing processing problems such as high extrusion load and surface roughness during polyolefin processing.

Moreover, U.S. Pat. Nos. 5,889,128 and 6,610,806 disclose a non-metallocene catalyst compound for polyolefin polymerization, including a tridentate ligand using a ligand containing Group 15 and Group 16 atoms, without including a cyclopentadienyl ligand. A polyolefin produced using the non-metallocene catalyst compound has a very high molecular weight and a very wide molecular weight distribution compared to a polyolefin produced using the metallocene compound including a cyclopentadienyl ligand. However, the tridentate non-metallocene catalyst compound exhibits low polyolefin polymerization activity and poor thermal stability compared to the metallocene compound including a cyclopentadienyl ligand, and thus faces a lot of obstacles to commercial application.

Therefore, it is necessary to develop a novel catalyst that exhibits a very high molecular weight, a very wide molecular weight distribution and high thermal stability so as to facilitate the commercial polymerization of a polyolefin resin having good processability.

CITATION LIST

Patent Literature (Patent Document 1) German Patent No. 2,608,933
(Patent Document 2) German Patent No. 3,007,725
(Patent Document 3) U.S. Pat. No. 5,889,128
(Patent Document 4) U.S. Pat. No. 6,610,806
(Patent Document 5) International Publication No. 2008/084931
(Patent Document 6) European Patent No. 129,368
(Patent Document 7) U.S. Pat. No. 4,874,880
(Patent Document 8) U.S. Pat. No. 5,324,800

Non-Patent Literature (Non-Patent Document 1) Kaminsky etc., "Bis(cyclopentadienyl)zirkon-Verbindungen und Aluminoxan als Ziegler-Katalysatoren für die Polymerisation und Copolymerisation von Olefinen", Makromol. Chem. Rapid Commun., 1983, 4, p. 417

SUMMARY OF THE INVENTION

Accordingly, an objective of the present invention is to provide a metallocene catalyst compound capable of producing a polyolefin resin having a molecular weight, a molecular weight distribution and a melt flow index ratio (shear response (SR)) in ranges suitable for a molding process under the high-stress extrusion conditions of pipes and films.

To this end, there is provided a novel metallocene catalyst compound in which at least one ligand containing a Group 15 or 16 element having a bulky substituent is coordinated so as to realize the characteristics of a polyolefin having a high molecular weight and a wide molecular weight distribution and also in which at least one cyclopentadienyl ligand is coordinated so as to realize superior thermal stability during polyolefin polymerization.

More specifically, there is provided a novel half-metallocene catalyst compound that makes it easy to control the molecular weight and molecular weight distribution of a polyethylene resin depending on the type of substituent of an aryl group attached to the ligand containing a Group 15 or 16 element or the type of substituent of cyclopentadienyl in the ligand of the catalyst compound.

In order to accomplish the above objective, the present invention provides a novel half-metallocene catalyst compound represented by Chemical Formula 1 below.

[Chemical Formula 1]

Here, in Chemical Formula 1, $L^1$ is a cyclopentadienyl group including no substituent or including at least one substituent of a C1-C10 alkyl group, an aryl group, and a C1-C10-alkyl-group-substituted silicon (Si), each of $L^2$ and $L^1$ is attached to a nitrogen atom (N), and is independently an aryl group, an aryl group substituted with a C1-C10 alkyl group, or an aryl group containing a halogen element, Y is a Group 15 or 16 element, Y being linked to N-$L^2$ and N-$L^3$ by $Z^1$ and $Z^2$, $Z^1$ and $Z^2$ are each independently a C1-C10 hydrocarbon including or not including at least one substituent of a C1-C10 alkyl group and an aryl group, M is titanium (Ti), zirconium (Zr) or hafnium (Hf), and X is absent or is at least one halogen, a C1-C10 hydrocarbon group, or a hetero atom including a C1-C10 hydrocarbon, depending on M.

In addition, the present invention provides a catalyst composition for olefin polymerization including the above half-metallocene catalyst compound and at least one selected from the group consisting of an activator and a carrier.

The activator may be at least one selected from the group consisting of borate, borane and alkylaluminoxane.

In addition, the present invention provides a method of producing an olefin polymer including bringing the above catalyst composition into contact with an olefin monomer.

Here, the olefin monomer may be at least one selected from the group consisting of ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene and derivatives thereof.

Also, olefin polymerization is preferably performed at a polymerization temperature of 20 to 200° C. and a polymerization pressure of 10 to 7000 psig.

According to the present invention, the novel half-metallocene catalyst compound has one atom that acts as a leaving group during activation using an aluminum compound and a boron compound, represented as X in Chemical Formula 1. In general, most Group 4 metal metallocene catalyst compounds include two leaving groups, which undergo monomer introduction and polymer growth through coordination with the central metal during polyolefin polymerization after activation. However, the catalyst compound according to the present invention is characterized in that it has one leaving group and in that only one leaving group is released during activation. Nevertheless, it can exhibit high polyolefin polymerization activity. This is because the number of electrons of the d orbital of the central metal is increased by the cyclopentadienyl group, which is the electron donor ligand represented in Chemical Formula 1, and also because a more stable state results when no cyclopentadienyl group is included.

In addition, a polymer obtained through polyolefin polymerization shows a high molecular weight and a wide molecular weight distribution, thereby ensuring superior processability and properties.

In addition, the polymerization activity and the molecular weight of the polymer can be easily controlled simply by changing the substituent of the cyclopentadienyl group.

BRIEF DESCRIPTION OF DRAWING

FIG. 1 is a graph showing the results of gel permeation chromatography (GPC) of polymers obtained using the catalyst compounds of Comparative Example 1 and Preparation Examples 1

DESCRIPTION OF SPECIFIC EMBODIMENTS

Hereinafter, a detailed description will be given of the present invention. In the following description, a polyolefin resin may be simply referred to as a polymer or polyolefin as needed, or may be referred to as an ethylene-based polymer, a polymer, a macromolecule, an olefin polymer, or the like.

A novel half-metallocene catalyst compound according to the present invention is capable of maintaining the characteristics of a conventional non-metallocene catalyst compound including a tridentate ligand containing Group 15 and Group 16 atoms, and of improving thermal stability, which is problematic, by coordinating a cyclopentadienyl ligand to a central metal.

Also, conventional metallocene compounds have a narrow molecular weight distribution and thus the properties of processed products are superior, but are disadvantageous because high energy is required due to the high extruder pressure during a molding process, surface defects may appear due to the high stress applied to the resin, and poor processing efficiency may result due to the low extrusion output thereof. Moreover, the weight average molecular weight (Mw) of the resulting polymer is very difficult to set within an ultrahigh molecular weight range of 10,000,000 or more, and within such a range the overall weight average molecular weight (Mw) thereof is very high, which makes the molding process very difficult. However, the present invention pertains to a novel single metallocene catalyst compound for polymerizing a polyolefin having a wide molecular weight distribution, and the weight average molecular weight (Mw) of the resulting polymer falls in the ultrahigh molecular weight range of 10,000,000 or more but the overall weight average molecular weight (Mw) thereof may be appropriate for processing by virtue of the wide molecular weight distribution thereof.

Moreover, the novel metallocene catalyst compound according to the present invention facilitates the control of the molecular weight depending on the type of substituent of the cyclopentadienyl ligand. For example, a polymer resulting from olefin polymerization using a catalyst compound coordinated with a cyclopentadienyl ligand having no substituent may have an increased weight average molecular weight (Mw) compared to when using a tridentate non-metallocene catalyst compound not coordinated with a cyclopentadienyl ligand, which can be confirmed through the results of gel permeation chromatography (GPC) in FIG. 1. On the other hand, a polymer resulting from olefin polymerization using a catalyst compound coordinated with a cyclopentadienyl ligand having a C4 hydrocarbon substituent may have a decreased weight average molecular weight (Mw) compared to when using a tridentate non-metallocene catalyst compound not coordinated with a cyclopentadienyl ligand, which can also be confirmed through the results of GPC in FIG. 1. Accordingly, the catalyst compound of the present invention may control the electron density of the central metal by selecting the type of substituent of the cyclopentadienyl ligand, ultimately adjusting the rate of olefin growth during the polymerization process.

Furthermore, a metallocene compound using a Group 4 metal element generally includes two leaving groups. When it is activated by an aluminum compound or a boron compound as an activator, two leaving groups are released, and when an olefin monomer is added after substitution with a hydrocarbon group, coordination polymerization of olefin occurs in the vacant space formed by releasing the leaving groups from the central metal, which can be confirmed in the metallocene catalyst compound including two cyclopentadienyl ligands disclosed in European Patent No. 129,368, U.S. Pat. Nos. 4,874,880, 5,324,800, Makromol. Chem. Rapid Commun., 4, 417(1983), etc., the half-metallocene catalyst compound coordinated with a monocyclopentadienyl ligand to which an amido group is introduced disclosed in International Publication No. 2008/084931, and the like, as described above. Also, the non-metallocene compound including a tridentate ligand disclosed in U.S. Pat. Nos. 5,889,128 and 6,610,806 has two leaving groups, and coordination polymerization of olefin occurs in the space formed by releasing the two leaving groups. However, the novel metallocene catalyst compound according to the present invention has only one leaving group, represented as X in Chemical Formula 1. When a Group 4 metal element metallocene compound having only one leaving group is activated using an aluminum compound or a boron compound as an activator, only one leaving group is released, and substitution with a hydrocarbon group causes the olefin coordination space to disappear. Moreover, since the catalyst compound is not a typically activated cationic compound, it is expected that the growth reaction of a polymer will no longer proceed. However, the catalyst compound of the present invention does not decrease the activity and molecular weight compared to catalyst compounds having two leaving groups during the olefin polymerization. Rather, the thermal stability thereof is increased by the cyclopentadienyl ligand, thus exhibiting higher activity. This means that the addition of an electron donor olefin enables the coordination of the olefin to the central metal because the electron density of the central metal is still low after the release of the leaving group and substitution with the hydrocarbon group even in the presence of a strong electron donor ligand such as a cyclopentadienyl ligand.

The present invention is described in more detail using the following Chemical Formula.

The present invention pertains to a novel half-metallocene catalyst compound represented by Chemical Formula 1 below.

$(L^1)\{(N-L^2)Z^1(Y)Z^2(N-L^3)\}(X)M$  [Chemical Formula 1]

In Chemical Formula 1, $L^1$ is a cyclopentadienyl group including no substituent or including at least one substituent of a C1-C10 alkyl group, an aryl group and a C1-C10-alkyl-group-substituted silicon (Si), each of $L^2$ and $L^3$ is attached to a nitrogen atom (N), and is independently an aryl group, an aryl group substituted with a C1-C10 alkyl group, or an aryl group containing a halogen element, Y is a Group 15 or 16 element, Y being linked to N-$L^2$ and N-$L^3$ by $Z^1$ and $Z^2$, $Z^1$ and $Z^2$ are each independently a C1-C10 hydrocarbon including or not including at least one substituent of a C1-C10 alkyl group and an aryl group, M is titanium (Ti), zirconium (Zr) or hafnium (Hf), and X is absent or is at least one halogen, a C1-C10 hydrocarbon group, or a hetero atom including a C1-C10 hydrocarbon, depending on M.

Non-limiting examples of $L^1$ include substituted or unsubstituted cyclopentadienyl, such as cyclopentadienyl, methylcyclopentadienyl, 1,2-dimethylcyclopentadienyl, 1,3-dimethylcyclopentadienyl, 1,3,4-trimethylcyclopentadienyl, 1,2,3,4-tetramethylcyclopentadienyl, ethylcyclopentadienyl, propylcyclopentadienyl, butylcyclopentadienyl, hexylcyclopentadienyl, isopropylcyclopentadienyl, isobutylcyclopentadienyl, tertbutylcyclopentadienyl, octadecylcyclopentadienyl, cyclopentylcyclopentadienyl, cyclohexylcyclopentadienyl, phenylcyclopentadienyl, 1,3-methylethylcyclopentadienyl, 1,3-methylpropylcyclopentadienyl, 1,3-methylbutylcyclopentadienyl, trimethylsilylcyclopentadienyl and 1,3-methyltrimethylsilylmethylcyclopentadienyl.

As in the above-listed examples, the compounds provided in the present invention include only one leaving group represented as X, and the substituents of aryl groups attached to nitrogen atoms may be variously changed so as to be suitable for the purpose.

More specifically, the half-metallocene catalyst compound may be represented by Chemical Formula 2 below.

[Chemical Formula 2]

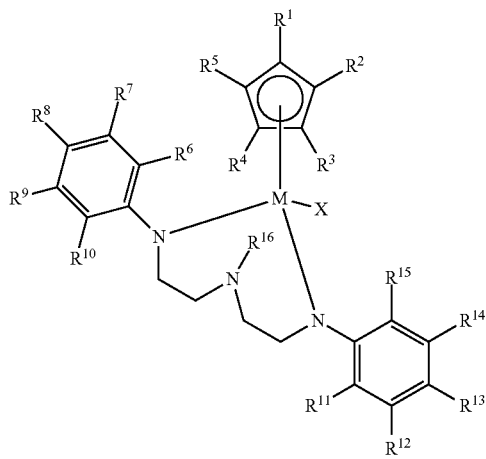

In Chemical Formula 2, $R^1$ to $R^5$ are each independently at least one selected from the group consisting of hydrogen, a C1-C10 alkyl group, an aryl group, and a C1-C10-alkyl-group-substituted silicon (Si), $R^6$ to $R^{15}$ are each independently at least one selected from the group consisting of hydrogen, halogen, a C1-C10 alkyl group, and a halomethyl group, $R^{16}$ is absent or is selected from the group consisting of hydrogen, a C1-C10 alkyl group, a C1-C10-alkyl-group-substituted silicon (Si), and a hetero atom, M is titanium (Ti), zirconium (Zr) or hafnium (Hf), and X is halogen, a C1-C10 hydrocarbon group, or a hetero atom including a C1-C10 hydrocarbon.

More particularly, in Chemical Formula 2, $R^1$ to $R^5$ may be hydrogen.

In Chemical Formula 2, any one of $R^1$ to $R^5$ may be one selected from the group consisting of methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and trimethylsilyl.

In Chemical Formula 2, the C1-C10 alkyl group of $R^6$ to $R^{15}$ may be at least one selected from the group consisting of methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, and 5-methylhexyl.

The novel half-metallocene catalyst compound according to the present invention may be used alone or in combinations of two or more with other catalyst compounds, and is used as a catalyst for polymerizing an olefin monomer along with an appropriate activator. As necessary, the metallocene catalyst compound and/or the activator may be supported on a solid carrier, and may thus be used as a solid-supported catalyst. Examples of the activator may include methylaluminoxane (MAO), modified methylaluminoxane (MMAO), ethylaluminoxane, isobutylaluminoxane, butylaluminoxane and mixtures thereof, and a fluorine-substituted aromatic boron-based ionic compound, such as tri(butyl)ammonium tetra(pentafluorophenyl)boron, N,N-dimethylanilinium tetra(pentafluorophenyl)boron, etc., or a modified clay, such as N,N-dimethylanilinium montmorillonite, N,N-dimethylanilinium hectorite, etc., may be used as the activator.

As the methylaluminoxane (MAO) or modified methylaluminoxane (MMAO) activator, any commercially available aluminoxane may be used, and it may be used after preparation through a known process, such as adding an appropriate amount of water to trialkylaluminum or reacting a hydrocarbon compound including water or an inorganic hydrate salt with trialkylaluminum. The aluminoxane is generally obtained in the form of a mixture of linear and circular aluminoxanes, and in the present invention, such linear or circular aluminoxanes may be used alone or in combination. Such aluminoxanes are commercially available in various hydrocarbon solution forms, among which the use of aluminoxane in aromatic hydrocarbon solution form is preferable, and more preferably, an aluminoxane solution dissolved in toluene is used.

Any or all components of the olefin polymerization catalyst may be used in the form of being fixed on the carrier, and such a carrier may be used without particular limitation so long as it is typically used for a catalyst for producing an olefin polymer.

The carrier may be any particulate organic or inorganic material, and the carrier particle size must be 200 μm or less in diameter. The most preferred particle size of the carrier material may be easily established through experimentation. The average particle size of the carrier is preferably 5 to 200 μm, more preferably 10 to 1501a, and most preferably 20 to 100 μm in diameter.

Appropriate examples of the inorganic carrier may include metal oxides, metal hydroxides, metal halides or other metal salts such as sulfates, carbonates, phosphates, nitrates and silicates, and more preferable examples thereof include compounds of Group 1 and Group 2 metals of the periodic table, such as salts of sodium or potassium, and oxides or salts of magnesium or calcium, for example, chloride, sulfate, carbonate, phosphate or silicate of sodium, potassium, magnesium or calcium, and for example, oxide or hydroxide of magnesium or calcium. Inorganic oxides such as silica, titania, alumina, zirconia, chromia, boron oxide, silanized silica, silica hydrogel, silica xerogel, silica aerogel and mixed oxides, for example, talc, silica/chromia, silica/chromia/titania, silica/alumina, silica/titania, silica/magnesia, silica/magnesia/titania, aluminum phosphate gel, silica co-gel and the like, may be used. Inorganic oxides may include small amounts of carbonate, nitrate, sulfate and oxide, for example, sodium carbonate, potassium carbonate, calcium carbonate, magnesium carbonate, sodium sulfate, aluminum sulfate, barium sulfate, potassium nitrate, magnesium nitrate, aluminum nitrate, sodium oxide and lithium oxide. Preferred is a carrier containing, as a main component, at least one selected from the group consisting of silica, alumina and mixtures thereof.

The amount of the activator that is used together with the metallocene catalyst compound prepared according to the present invention may vary across a wide range, and the molar ratio of aluminum of aluminoxane to transition metal of the metallocene catalyst compound ([aluminum]:[transition metal]) may fall in the range of 1:1 to 100,000:1, and preferably 5:1 to 15,000:1.

The metallocene catalyst composition prepared according to the present invention may be used for polyolefin polymerization in the form of a solution in which the metallocene catalyst compound and the activator are uniformly dissolved in a hydrocarbon solvent, and may also be used in a form in which the metallocene catalyst compound and/or the activator are supported on an inorganic oxide carrier (e.g. silica, alumina, silica-alumina mixture, etc.) or in the form of insoluble particles thereof. Thus, the catalyst composition for olefin polymerization composed of the metallocene catalyst compound of the present invention and the activator may be applied to all of solution polymerization, slurry polymerization and vapor polymerization of olefin. Here, individual polymerization reaction conditions may be set variously depending on the type of metallocene catalyst compound that is used, the phase of the catalyst composed of metallocene/activator (homogeneous phase or heterogeneous phase (supported)), the type of polymerization process (solution polymerization, slurry polymerization, or vapor polymerization), the polymerization results to be obtained, or the polymer form.

The metallocene catalyst compound prepared according to the present invention may polymerize ethylene in the presence of various other olefins along with the aluminoxane activator, and examples of the other olefins include α-olefin hydrocarbons having 2 to 12 carbon atoms, preferably 3 to 10 carbon atoms, such as ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene, derivatives thereof and mixtures thereof.

The olefin polymerization reaction may be carried out in the presence of a liquid or vapor medium (diluent), and the medium must be a non-reactive material that does not adversely affect the catalyst system, and examples thereof include propane, butane, isobutane, pentane, hexane, heptane, octane, cyclohexane, methylcyclohexane, toluene, xylene, derivatives thereof and mixtures thereof. Here, it is preferred that the catalyst poison in the reaction medium be removed before olefin polymerization.

The olefin polymerization temperature may vary depending on the reactants, reaction conditions, and the like, and a typical polymerization temperature is about 20 to 200° C. and a polymerization temperature is 10 to 7000 psig. The molecular weight of the polymer produced using the polymerization catalyst of the present invention may be controlled by varying the polymerization temperature or by injecting hydrogen into the reactor.

In the present invention, the novel half-metallocene catalyst compound for olefin polymerization and the preparation method thereof are provided. A better understanding of the present invention will be given through the following examples. These examples are merely set forth to illustrate the present invention, but are not to be construed as limiting the scope of the present invention.

In the following examples, the metallocene compound of the present invention was prepared using a Schlenk technique, in which air and moisture were completely blocked, and purified and dried nitrogen was used as an inert gas. Moreover, a solvent was mostly dried in the presence of sodium metal in an inert nitrogen atmosphere, and dichloromethane was dried in the presence of calcium hydride and used. Deuterated solvents such as $CDCl_3$ and $C_6D_6$ for nuclear magnetic spectrometry were dried in the presence of sodium metal and used.

To demonstrate the structure of the catalyst, spectra were obtained using a 500 MHz nuclear magnetic resonator (NMR) available from BRUKER.

Analysis of polymers resulting from olefin polymerization using the novel half-metallocene catalyst compound according to the present invention was carried out as follows.

(1) Density: Measurement in accordance with ASTM 1505 and ASTM D 1928.

(2) Melt flow index (MIP, 5.0 kg/10 min): Measurement at 190° C. in accordance with ASTM 01238.

(3) High-load melt flow index (MIF, 21.6 kg/10 min): Measurement at 190° C. in accordance with ASTM D1238.

(4) Melt flow index ratio (shear response (SR)): High-load melt flow index (MIF)/melt flow index (MIP)

(5) GPC molecular weight and molecular weight distribution (Mw, Mz, Mz+1, MWD): Measurement using GPC (Polymer Laboratory Inc., No. 220 product). As separation columns, two Olexis columns and one Guard column were used, and the column temperature was maintained at 160° C. For calibration, a standard polystyrene set, available from Polymer Laboratory, was used, and the eluent was trichlorobenzene containing 0.0125 wt % of dibutyl hydroxyl toluene (BHT) as an antioxidant. A sample was prepared in an amount of 0.1 to 1 mg/ml, and the injection amount was 0.2 ml and the injection time was 30 min. The pump flow rate was maintained at 1.0 ml/min, and the measurement time was 30 to 60 min. Universal calibration was performed using Easical A and Easical B (Agilent), which were polystyrene standards, followed by conversion into polyethylene to measure the number average molecular weight (Mn), weight average molecular weight (Mw) and z average molecular weight (Mz). A refractive index (RI) detector was used as the detector. The molecular weight distribution (Mw/Mn) represents the ratio of weight average molecular weight and number average molecular weight.

[Example 1] Preparation of $[(2,3,4,5,6-Me_5C_6)NHCH_2H_2CH_2]_2NH$ 2.0 g (19.39 mmol) of diethylenetriamine, 8.806 g (38.77 mmol) of 1-bromopentamethylbenzene, 0.0888 g (0.97 mmol) of tris(dibenzylideneacetone)-dipalladium(0), 0.18 g (0.29 mmol) of (R)-(+)-2,2'-bis(diphenylphosphino)-1,1'-binaphthalene ((R)-BINAP), 5.59 g (58.16 mmol) of sodium tert-butoxide, and 100 ml of toluene were placed in a Schlenk flask in a glove box with a nitrogen atmosphere and then stirred at 100° C. for 24 hr in a nitrogen atmosphere to afford a mixed solution. The mixed solution turned into a red suspension. Subsequently, the solvent was completely removed in a vacuum, after which the resulting product was dissolved in 150 ml of dichloromethane and then added with a saturated sodium chloride aqueous solution, followed by extracting the organic layer. Extraction of the organic layer from the aqueous layer was repeated three times using dichloromethane. The organic layer was dewatered using $MgSO_4$ and then filtered, and the solvent of the organic layer was completely removed in a vacuum. Then, the resulting product was washed with hexane, after which the solvent was completely removed in a vacuum, thereby obtaining 7.1 g of a light yellow solid at 93% yield.

$^1H$ NMR (500 MHz, $CDCl_3$) of the solid was measured, and the results thereof were as follows.

δ ppm 2.96-2.94 (q, 4H), 2.89-2.87 (q, 4H), 2.24 (s, 12H), 2.18 (s, 12H), 2.17 (s, 6H)

[Example 2] Preparation of $[(2,4,6-Me_3C_6H_2)NHCH_2CH_2]_2NH$ 6.7 g (64.94 mmol) of diethylenetriamine, 25.86 g (129.90 mmol) of 2-bromomesitylene, 0.30 g (0.33 mmol) of tris(dibenzylideneacetone)-dipalladium(0), 0.61 g (0.97 mmol) of (R)-(+)-2,2'-bis(diphenylphosphino)-1,1'-binaphthalene ((R)-BINAP), 18.72 g (195 mmol) of sodium tert-butoxide, and 230 ml of toluene were placed in a Schlenk flask in a glove box with a nitrogen atmosphere and then stirred at 100° C. for 24 hr in a nitrogen atmosphere. Subsequently, the solvent was completely removed in a vacuum, after which the resulting product was dissolved in 150 ml of dichloromethane and then added with a saturated sodium chloride aqueous solution, followed by extracting the organic layer. Extraction of the organic layer from the aqueous layer was repeated three times using dichloromethane. The organic layer was dewatered using $MgSO_4$ and then filtered, and the solvent of the organic layer was completely removed in a vacuum. Then, the resulting product was washed with hexane, after which the solvent was completely removed in a vacuum, thereby obtaining 19.6 g of a brown solid at 89% yield.

$^1H$ NMR (500 MHz, $CDCl_3$) of the solid was measured, and the results thereof were as follows.

δ ppm=6.87 (s, 4H), 3.14-3.10 (t, 4H), 2.95-2.92 (t, 4H), 2.28 (s, 12H), 2.21 (s, 6H)

[Example 3] Preparation of Trisbenzyl Cyclopentadienyl Zirconium [CpZrBn$_3$]

Cyclopentadienyl zirconium trichloride (CpZrCl$_3$, 2.1 g, 8.01 mmol) and 100 ml of toluene were placed in a Schlenk flask in a glove box with a nitrogen atmosphere. Subsequently, cooling to −78° C. was performed, after which benzyl magnesium chloride ((C$_6$H$_5$CH$_2$) MgCl 1.0 M in diethyl ether, 24.8 ml, 24.8 mol) was slowly added to the cooled mixed solution using a syringe and then stirred at room temperature for 12 hr. The reaction solution was filtered through Celite, after which the resulting solution was dried in a vacuum. Then, washing with n-hexane, filtration and drying in a vacuum were performed, thereby obtaining 3.3 g of a yellow solid at 96% yield.

$^1$H NMR (500 MHz, C$_6$D$_6$) of the solid was measured, and the results thereof were as follows.

δ ppm=7.09-7.06 (t, 6H), 6.97-6.94 (t, 3H), 6.48-6.46 (d, 6H), 5.60 (s, 5H), 1.49 (s, 6H)

[Example 4] Preparation of Trisbenzyl Normal-Butyl Cyclopentadienyl Zirconium [nBuCpZrBn$_3$]

Normal-butyl cyclopentadienyl trichloride (nBuCpZrCl$_3$, 4.33 g, 13.59 mmol) and 150 ml of toluene were placed in a Schlenk flask in a glove box with a nitrogen atmosphere. Subsequently, cooling to −78° C. was performed, after which benzyl magnesium chloride ((C$_6$H$_5$CH$_2$) MgCl 1.0 M in diethyl ether, 41.0 ml, 41.0 mmol) was slowly added to the cooled mixed solution using a syringe and then stirred at room temperature for 12 hr. The reaction solution was filtered through Celite, after which the resulting solution was dried in a vacuum, thereby obtaining 5.3 g of a clear orange oil at 80% yield.

$^1$H NMR (500 MHz, C$_6$D$_6$) of the solid was measured, and the results thereof were as follows.

δ ppm=7.11-7.08 (t, 6H), 6.97-6.94 (t, 3H), 6.56-6.54 (d, 6H), 5.61-5.60 (t, 2H), 5.43-5.42 (t, 2H), 2.20-2.17 (t, 2H), 1.59 (s, 6H), 1.43-1.37 (m, 2H), 1.26-1.20 (m, 2H), 0.87-0.84 (t, 3H)

[Example 5] Preparation of Trisbenzyl Isopropylcyclopentadienyl Zirconium [$^i$PrCpZrBn$_3$]

Isopropylcyclopentadienyl lithium ($^i$PrCpLi, 6.3 g, 55.25 mmol) and 300 ml of hexane were placed in a Schlenk flask in a glove box with a nitrogen atmosphere. Subsequently, cooling to −78° C. was performed, after which trimethylsilyl chloride (Me$_3$SiCl, 6.9 g, 63.53 mmol) was slowly added to the cooled mixed solution using a syringe and then stirred at room temperature for 12 hr. The reaction solution was filtered through Celite, after which the resulting solution was dried at 25° C. under 60 torr, followed by heating to 180-200° C. using a distillation fractionation process, thus obtaining 10.7 g of 1-isopropyl-3-trimethylsilylcyclopentadiene at 94.4% yield.

Next, zirconium tetrachloride (ZrCl$_4$, 7.96 g, 34.15 mmol) and 280 ml of toluene were placed in a Schlenk flask, and 1-isopropyl-3-trimethylsilylcyclopentadiene (6.2 g, 34.15 mmol) and 100 ml of toluene were placed in another Schlenk flask. Subsequently, the 1-isopropyl-3-trimethylsilylcyclopentadiene/toluene solution was slowly added to the zirconium tetrachloride/toluene suspension, which was cooled to 0° C., using a syringe, and then stirred at room temperature for 12 hr. The reaction solution was dried in a vacuum and then washed with cold toluene and diethylether, and the resulting solid was filtered and dried in a vacuum, thus obtaining 8.3 g of a brown isopropylcyclopentadienyl zirconium trichloride ($^i$PrCpZrCl$_3$) solid at 80% yield. Subsequently, isopropylcyclopentadienyl zirconium trichloride ($^i$PrCpZrCl$_3$, 1.5 g, 4.90 mmol) and 100 ml of toluene were placed in a Schlenk flask and then cooled to −78° C., after which benzyl magnesium chloride ((C$_6$H$_5$CH$_2$) MgCl 1.0 M in diethyl ether, 15.3 ml, 15.3 mmol) was slowly added to the cooled mixed solution using a syringe and then stirred at room temperature for 12 hr. The reaction solution was filtered through Celite, after which the resulting solution was dried in a vacuum, washed with hexane, filtered, and then dried in a vacuum, thereby obtaining 2.2 g of a brown solid at 96% yield.

$^1$H NMR (500 MHz, C$_6$D$_6$) of the finally obtained brown solid was measured, and the results thereof were as follows.

δ ppm=7.11-7.08 (t, 6H), 6.97-6.94 (t, 3H), 6.56-6.54 (d, 6H), 5.64-5.63 (t, 2H), 5.41-5.40 (t, 2H), 2.56-2.50 (m, 1H), 1.60 (s, 6H), 1.05-1.03 (d, 6H)

[Example 6] Preparation of Trisbenzyl Trimethylsilylcyclopentadienyl Zirconium [Me$_3$SiCpZrBn$_3$]

Zr(C$_8$H$_{13}$Si)$_2$Cl$_2$ (7.0 g, 0.0160 mol), ZrCl$_4$ (4.1 g, 0.0716 mol) and 100 ml of toluene were placed in a 250 ml flask in a glove box with a nitrogen atmosphere. Subsequently, stirring at 100° C. for 12 hr was performed, and the reaction solution was filtered through Celite, after which the resulting solution was dried in a vacuum. The resulting trimethylsilylcyclopentadienyl zirconium trichloride (TMSCpZrCl$_3$) was washed with diethyl ether and then dried in a vacuum (yield: 7.3 g, 68%).

Next, trimethylsilylcyclopentadienyl zirconium trichloride (TMSCpZrCl$_3$, 3.0 g, 8.959 mmol) and 50 ml of toluene were placed in a Schlenk flask in a glove box with a nitrogen atmosphere, and then cooled to −78° C. outdoors using acetone and dry ice. Subsequently, benzyl magnesium chloride (1.0 M in diethyl ether, 26.9 ml, 0.0269 mol) was slowly added dropwise to the cooled mixed solution using a syringe and then allowed to react for 12 hr or more. The reaction solution was filtered through Celite, after which the resulting solution was dried in a vacuum, and the resulting solid material was washed with hexane and then dried in a vacuum, thereby obtaining 3.5 g of a brown solid at 78% yield.

$^1$H NMR (500 MHz, C$_6$D$_6$) of the brown solid was measured, and the results thereof were as follows.

δ ppm=7.11-7.08 (t, 6H), 7.00-6.95 (t, 3H), 6.57-6.55 (d, 6H), 5.98-5.97 (t, 28), 5.60-5.59 (t, 2H), 1.64 (s, 6H), 0.19 (s, 9H)

[Example 7] Preparation of {[(2,3,4,5,6-Me$_5$C$_5$)NCH$_2$CH$_2$]$_2$NH}Zr(C$_6$H$_5$CH$_2$) (C$_5$H$_5$)

[Chemical Formula 3]

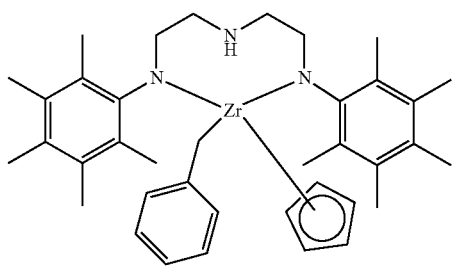

Trisbenzyl cyclopentadienyl zirconium [CpZrBn₃] (Zr(C₆H₅CH₂)₃(C₅H₅), 0.279 g, 0.647 mmol) prepared in Example 3 and 10 ml of toluene were placed in a 50 ml flask in a glove box with a nitrogen atmosphere. Subsequently, [(2,3,4,5,6-Me₅C₆)NCH₂CH₂]₂NH (0.257 g, 0.647 mmol) prepared in Example 1 and 5 ml of toluene were placed in another flask, slowly added to the trisbenzyl cyclopentadienyl zirconium toluene solution and stirred at room temperature for 3 hr. The reaction solution was filtered through Celite, after which the resulting solution was dried in a vacuum. Thereafter, the resulting solid material was washed with hexane and then dried in a vacuum, thereby obtaining 0.35 g of a brown solid at 83% yield.

¹H NMR (500 MHz, C₆D₆) of the solid was measured, and the results thereof were as follows.

δ ppm=7.36-7.20 (m, 3H), 7.26-7.24 (d, 2H), 5.50 (s, 5H), 3.18-3.12 (m, 2H), 2.98-2.92 (m, 2H), 2.61-2.56 (m, 2H), 2.49-2.43 (m, 2H), 2.49 (s, 6H), 2.35 (s, 2H), 2.29 (s, 6H), 2.24 (s, 6H), 2.22 (s, 6H), 2.18 (s, 6H)

[Example 8] Preparation of {[(2,4,6-Me₃C₆H₂)NCH₂CH₂]₂NH}Zr(C₆H₅CH₂) (C₅H₅)

[Chemical Formula 4]

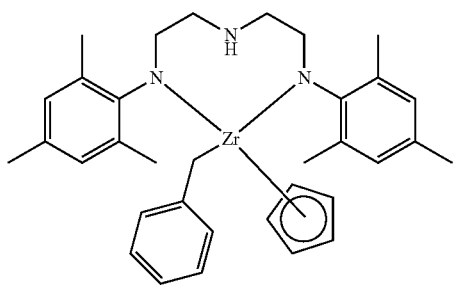

Trisbenzyl cyclopentadienyl zirconium [CpZrBn₃](Zr(C₆H₅CH₂)₃(C₅H₅), 0.380 g, 0.884 mmol) prepared in Example 3 and 10 ml of toluene were placed in a 50 ml flask in a glove box with a nitrogen atmosphere. Subsequently, [(2,4,6-Me₃C₆H₂)NCH₂CH₂]₂NH (0.300 g, 0.884 mmol) prepared in Example 2 and 5 ml of toluene were placed in another flask, slowly added to the trisbenzyl cyclopentadienyl zirconium toluene solution and stirred at room temperature for 3 hr. The reaction solution was filtered through Celite, after which the resulting solution was dried in a vacuum. Thereafter, the resulting solid material was washed with hexane and then dried in a vacuum, thereby obtaining 0.38 g of a brown solid at 73% yield.

¹H NMR (500 MHz, C₆D₆) of the solid was measured, and the results thereof were as follows.

δ ppm=7.32-7.24 (m, 5H), 6.94 (s, 4H), 5.51 (s, 5H), 3.14-3.08 (m, 2H), 2.95-2.92 (m, 2H), 2.51-2.49 (m, 2H), 2.39 (s, 6H), 2.38-2.35 (m, 2H), 2.28 (s, 2H), 2.29 (s, 6H), 2.20 (s, 6H)

[Example 9] Preparation of {[(2,3,4,5,6-Me₅C₆)NCH₂CH₂]₂NH}Zr(C₆H₅CH₂) (n-Bu-C₅H₄)

[Chemical Formula 5]

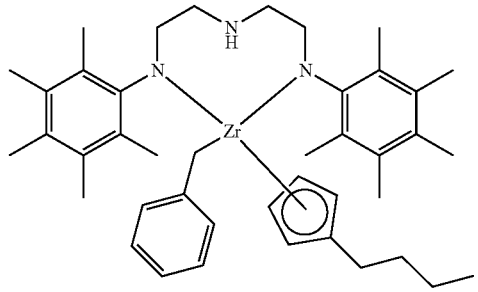

Trisbenzyl normal-butylcyclopentadienyl zirconium [nBuCpZrBn₃] (Zr(C₆H₅CH₂)₃(n-Bu-C₅H₄), 0.379 g, 0.78 mmol) prepared in Example 4 and 10 ml of toluene were placed in a 50 ml flask in a glove box with a nitrogen atmosphere. Subsequently, [(2,3,4,5,6-Me₅C₆)NCH₂CH₂]₂NH (0.310 g, 0.78 mmol) prepared in Example 1 and 5 ml of toluene were placed in another flask, slowly added to the trisbenzyl normal-butylcyclopentadienyl zirconium toluene solution, and stirred at room temperature for 3 hr. The reaction solution was filtered through Celite, after which the resulting solution was dried in a vacuum. Thereafter, the resulting solid material was washed with hexane and then dried in a vacuum, thereby obtaining 0.31 g of a purple solid at 57% yield.

¹H NMR (500 MHz, C₆D₆) of the solid was measured, and the results thereof were as follows.

δ ppm=7.33-7.27 (m, 5H), 5.37-5.36 (t, 2H), 5.24-5.23 (t, 2H), 3.21-3.16 (m, 2H), 3.03-2.98 (m, 2H), 2.63-2.58 (m, 2H), 2.53-2.48 (m, 2H), 2.44 (s, 6H), 2.32 (s, 6H), 2.25 (s, 6H), 2.22 (s, 6H), 2.18 (s, 6H), 2.15 (s, 2H), 1.30-1.24 (m, 3H), 1.14-1.09 (m, 2H), 0.90-0.87 (t, 1H), 0.74-0.71 (t, 3H)

[Example 10] Preparation of {[(2,4,6-Me₃C₆H₂)NCH₂CH₂]₂NH}Zr(C₆H₅CH₂) (n-Bu-C₅H₄)

[Chemical Formula 6]

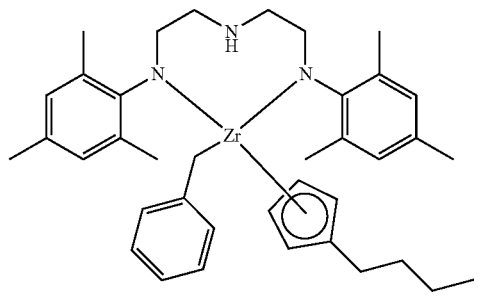

Trisbenzyl normal-butylcyclopentadienyl zirconium [nBuCpZrBn₃] (Zr(C₆H₅CH₂)₃(n-Bu-C₅H₄), 0.50 g, 1.03 mmol) prepared in Example 4 and 10 ml of toluene were placed in a 50 ml flask in a glove box with a nitrogen atmosphere. Subsequently, [(2,4,6-Me₃C₆H₂)NCH₂CH₂]₂NH (0.353 g, 1.04 mmol) prepared in Example 2 and 5 ml of toluene were placed in another flask, slowly added to the trisbenzyl normal-butylcyclopentadienyl zirconium toluene solution, and stirred at room temperature for 24 hr. The reaction solution was filtered through Celite, after which the resulting solution was dried in a vacuum. Thereafter, the resulting solid material was washed with hexane and then dried in a vacuum, thereby obtaining 0.26 g of a yellow solid at 40% yield.

$^1$H NMR (500 MHz, $C_6D_6$) of the solid was measured, and the results thereof were as follows.

δ ppm=7.27-7.24 (t, 3H), 7.19-7.18 (d, 2H), 6.97 (s, 2H), 6.94 (s, 2H), 5.38-5.37 (t, 2H), 5.26-5.25 (t, 2H), 3.18-3.14 (m, 2H), 3.02-2.97 (m, 2H), 2.55-2.49 (m, 2H), 2.41 (s, 6H), 2.40 (s, 2H), 2.38-2.35 (m, 2H), 2.25 (s, 6H), 2.24 (s, 6H), 1.36-1.29 (m, 3H), 1.17-1.12 (m, 2H), 0.86-0.83 (t, 1K), 0.76-0.73 (t, 3H)

[Example 11] Preparation of {[(2,3,4,5,6-Me$_5$C$_6$) NCH$_2$CH$_2$]$_2$NH}Zr(C$_6$H$_5$CH$_2$) (i-Pr—C$_5$H$_4$)

[Chemical Formula 7]

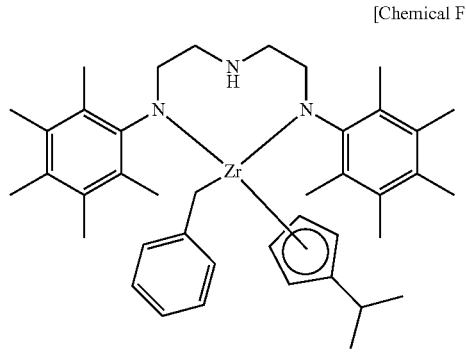

Trisbenzyl isopropylcyclopentadienyl zirconium [($^i$P-rCpZrBn$_3$] (Zr(C$_6$H$_5$CH$_2$)$_3$ (i-Pr—C$_5$H$_4$), 0.692 g, 1.467 mmol) prepared in Example 5 and 10 ml of toluene were placed in a 50 ml flask in a glove box with a nitrogen atmosphere. Subsequently, [(2,3,4,5,6-Me$_5$C$_6$)NCH$_2$CH$_2$]$_2$NH (0.581 g, 1.467 mmol) prepared in Example 1 and 5 ml of toluene were placed in another flask, slowly added to the trisbenzyl isopropylcyclopentadienyl zirconium toluene solution, and stirred at room temperature for 3 hr. The reaction solution was dried in a vacuum, dissolved again in diethyl ether, and then filtered through Celite, and the resulting solution was dried in a vacuum. Thereafter, the resulting solid material was washed with hexane and then dried in a vacuum, thereby obtaining 0.80 g of a brown solid at 79% yield.

$^1$H NMR (500 MHz, $C_6D_6$) of the solid was measured, and the results thereof were as follows.

δ ppm=7.32-7.24 (m, 5H), 5.37-5.36 (t, 2H), 5.29-5.28 (t, 2H), 3.20-3.15 (m, 28), 3.03-2.98 (m, 2H), 2.85-2.79 (m, 1H), 2.59-2.55 (m, 2H), 2.51-2.46 (m, 2H), 2.44 (s, 6H), 2.32 (s, 6H), 2.25 (s, 2H), 2.23 (s, 2H), 2.21 (s, 6H), 2.18 (s, 6H), 1.07-1.05 (d, 6H)

[Example 12] Preparation of {[(2,3,4,5,6-Me$_5$C$_6$) NCH$_2$CH$_2$]$_2$NH}Zr(C$_6$H$_5$CH$_2$) (TMS-C$_5$H$_4$)

[Chemical Formula 8]

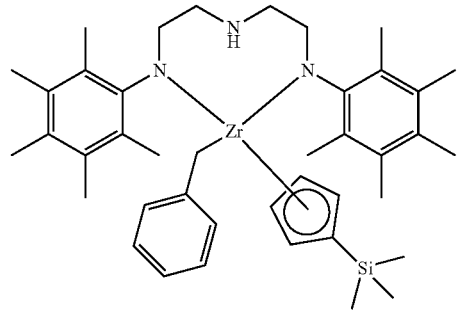

14 Trisbenzyl trimethylsilylcyclopentadienyl zirconium [TMSCpZrBn$_3$] (Zr(C$_6$H$_5$CH$_2$)$_3$(Me$_3$SiC$_5$H$_4$), 1.287 g, 2.564 mmol) prepared in Example 6 and 20 ml of toluene were placed in a 50 ml flask in a glove box with a nitrogen atmosphere. Subsequently, [(2,3,4,5,6-Me$_5$C$_6$) NCH$_2$CH$_2$]$_2$NH (1.014 g, 2.564 mmol) prepared in Example 1 and 10 ml of toluene were placed in another flask, slowly added to the trisbenzyl trimethylsilylcyclopentadienyl zirconium toluene solution, and stirred at room temperature for 8 hr. The reaction solution was dried in a vacuum, dissolved again in diethyl ether, and then filtered through Celite, and the resulting solution was recrystallized at −30° C., thereby obtaining 0.99 g of a light brown solid at 54% yield.

$^1$H NMR (500 MHz, $C_6D_6$) of the solid was measured, and the results thereof were as follows.

δ ppm=7.23-7.17 (m, 5H), 5.59-5.58 (t, 2H), 5.52-5.51 (t, 2H), 3.13-3.08 (m, 2H), 2.97-2.91 (m, 2H), 2.52-2.49 (m, 2H), 2.48 (s, 6H), 2.40 (s, 2H), 2.38-2.34 (m, 2H), 2.22 (s, 6H), 2.21 (s, 6H), 2.16 (s, 6H), 2.13 (s, 6H), 0.21 (s, 9H)

[Preparation Example 1] Process of Preparing Supported Catalyst Using Catalyst Obtained in Example 7

The organic transition metal compound {[(2,3,4,5,6-Me$_5$C$_6$)NCH$_2$CH$_2$]$_2$NH}Zr(C$_6$H$_5$CH$_2$)(C$_5$H$_5$) obtained in Example 7 and methylaluminoxane (MAO, available from Albemarle, 10% toluene solution) were mixed in a Schlenk flask in a nitrogen atmosphere and stirred at room temperature for 30 min to afford a solution. The solution was added with calcined silica (SiO$_2$) and sonicated for 1 hr, after which the supernatant was removed therefrom. Then, the remaining solid particles were washed two times with hexane and then dried in a vacuum, thereby preparing a supported catalyst in a solid powder phase including a free-flowing metallocene compound and methylaluminoxane.

[Preparation Example 2] Process of Preparing Supported Catalyst Using Catalyst Obtained in Example 9

A supported catalyst in a solid powder phase was prepared in the same manner as in Preparation Example 1, with the exception that {[(2,3,4,5,6-Me$_5$C$_6$)NCH$_2$CH$_2$]$_2$NH}Zr (C$_6$H$_5$CH$_2$) (n-Bu-C$_5$H$_4$) obtained in Example 9 was used as the organic transition metal compound.

[Preparation Example 3] Process of Preparing Supported Catalyst Using Catalyst Obtained in Example 10

A supported catalyst in a solid powder phase was prepared in the same manner as in Preparation Example 1, with the exception that {([(2,4,6-Me$_3$C$_6$H$_2$)NCH$_2$CH$_2$]$_2$NH}Zr(C$_6$H$_5$CH$_2$)(n-Bu-C$_5$H$_4$) obtained in Example 10 was used as the organic transition metal compound.

[Preparation Example 4] Process of Preparing Supported Catalyst Using Catalyst Obtained in Example 11

A supported catalyst in a solid powder phase was prepared in the same manner as in Preparation Example 1, with the exception that {[(2,3,4,5,6-Me$_5$C$_6$)NCH$_2$CH$_2$H]$_2$NH}Zr(C$_6$H$_5$CH$_2$)(i-Pr—C$_5$H$_4$) obtained in Example 11 was used as the organic transition metal compound.

[Preparation Example 5] Process of Preparing Supported Catalyst Using Catalyst Obtained in Example 12

A supported catalyst in a solid powder phase was prepared in the same manner as in Preparation Example 1, with the exception that {[(2,3,4,5,6-Me$_5$C$_6$)NCH$_2$CH$_2$]$_2$NH}Zr(C$_6$H$_5$CH$_2$)(TMS-C$_5$H$_4$) obtained in Example 12 was used as the organic transition metal compound.

[Comparative Example 1] Process of Preparing Supported Catalyst Using {[(2,3,4,5,6-Me$_5$C$_6$)NCH$_2$CH$_2$]$_2$NH}Zr(C$_6$H$_5$CH$_2$)$_2$ Catalyst A supported catalyst in a solid powder phase was prepared in the same manner as in Preparation Example 1, with the exception that {[(2,3,4,5,6-Me$_5$C$_6$)NCH$_2$CH$_2$]$_2$NH}Zr(C$_6$H$_6$CH$_2$)$_2$ disclosed in U.S. Pat. No. 6,610,806 mentioned in "Background of the Invention" above was used.

The copolymerization method was carried out in a 2 L stainless steel reactor for high-temperature high-pressure slurry reaction, the supported catalyst obtained in each of Comparative Example 1 and Preparation Examples 1 to 5 was added, and triethylaluminum was used as a cocatalyst. Specifically, isobutane and the supported metallocene catalyst were placed in a 2 L reactor, after which ethylene, hexene-1 and hydrogen were continuously introduced thereto, thus obtaining a polyethylene copolymer (ethylene/1-hexene copolymerization). The molecular weight and molecular weight distribution results when using the supported metallocene catalysts of Comparative Example 1 and Preparation Examples 1 to 5 under the same copolymerization conditions were confirmed through the polymerization tests of Polymerization Examples 1 to 6 according to the present invention. The polymerization conditions and results thereof are shown in Table 1 below.

TABLE 1

| No. | Polymerization Example 1 | Polymerization Example 2 | Polymerization Example 3 | Polymerization Example 4 | Polymerization Example 5 | Polymerization Example 6 |
|---|---|---|---|---|---|---|
| Catalyst | Comparative Example 1 | Preparation Example 1 | Preparation Example 2 | Preparation Example 3 | Preparation Example 4 | Preparation Example 5 |
| Polymerization temp (C.) | 90 | 90 | 90 | 90 | 90 | 90 |
| Pressure (psig.) | 380 | 380 | 380 | 380 | 380 | 380 |
| Hydrogen (ppm) | 150 | 150 | 150 | 150 | 150 | 150 |
| 1-Hexene (ml) | 8 | 8 | 8 | 8 | 8 | 8 |
| Polymerization time (min) | 60 | 60 | 60 | 60 | 60 | 60 |
| MIE$_{7.16}$ (dg/min) | 0.078 | Not meaured | 0.686 | 28.78 | Not Measured | Not measured |
| MIF$_{21.6}$ (dg/min) | 4.398 | Not measured | 12.48 | Not measured | 0.25 | 0.06 |
| Density (g/cc) | 0.955 | 0.97 or more | 0.9427 | 0.9480 | 0.9429 | 0.9309 |
| M$_w$ | 295,940 | 654,645 | 134,462 | 44,390 | 434,250 | 574,514 |
| M$_z$ | 257,937 | 2,742,281 | 274,753 | 140,552 | 1,627,000 | 1,900,933 |
| M$_{z+1}$ | 6,949,586 | 5,751,192 | 491,216 | 297,434 | 3,619,201 | 4,025,049 |
| PD | 11.78 | 5.94 | 2.45 | 4.40 | 7.61 | 5.67 |
| Mz/Mw | 0.87 | 4.19 | 2.04 | 3.17 | 3.75 | 3.31 |
| M$_x$ < 1.0$^{-3}$ (%) | 0.21 | 0.00 | 0.00 | 1.05 | 0.00 | 0.00 |
| M$_w$ > 1.0$^{-6}$ (%) | 8.26 | 19.05 | 0.28 | 0.01 | 11.87 | 17.13 |

As is apparent from Table 1, it can be confirmed that it is possible to control the molecular weight depending on the type of substituent of aryl group attached to the ligand in the metallocene catalyst or the type of substituent of cyclopentadienyl, and also that a polymer having a high molecular weight can be selectively produced depending on the substituent, compared to Comparative Example 1.

The present invention is intended to provide a metallocene catalyst compound capable of producing a polyolefin resin having a molecular weight, a molecular weight distribution and a melt flow index ratio (shear response (SR)) in ranges suitable for a molding process under the high-stress extrusion conditions of pipes and films.

To this end, there is provided a novel half-metallocene catalyst compound in which at least one ligand containing a Group 15 or 16 element having a bulky substituent is coordinated so as to realize the characteristics of a polyolefin having a high molecular weight and a wide molecular weight distribution and also in which at least one cyclopentadienyl ligand is coordinated so as to realize superior thermal stability during polyolefin polymerization.

Specifically, an organometallic compound including both a ligand containing a Group 15 or 16 element and a cyclopentadienyl ligand of various substituents was prepared and supported, after which olefin polymerization was evaluated. As monomers, ethylene and 1-hexene were copolymerized, and GPC analysis was performed after polymerization under the same polymerization conditions as shown in Table 1 in order to confirm the molecular weight and molecular weight distribution in the presence of each catalyst.

In order to compare the effects of cyclopentadiene, {[(2, 3,4,5,6-Me$_5$C$_6$)NCH$_2$CH$_2$]$_2$NH}Zr(C$_6$H$_5$CH$_2$)$_2$, which is a catalyst including only a ligand containing a Group 15 element without including cyclopentadiene, disclosed in U.S. Pat. No. 6,610,806, was used, and was compared with the novel catalysts prepared according to the present invention under the same polymerization conditions as in Polymerization Example 1 of Table 1.

Based on the polymerization results, as shown in Table 1, it was easy to control the molecular weight depending on the substituent of cyclopentadiene, which is a ligand not included in Comparative Example 1, and a polyolefin having a very high molecular weight was obtained depending on the substituent, compared to Comparative Example 1. In the present invention, a Group 4 metal catalyst system coordinated with both a ligand containing a Group 15 or 16 hetero element and a cyclopentadiene ligand of metallocene was developed.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:
1. A metallocene catalyst compound represented by Chemical Formula 2:

[Chemical Formula 2]

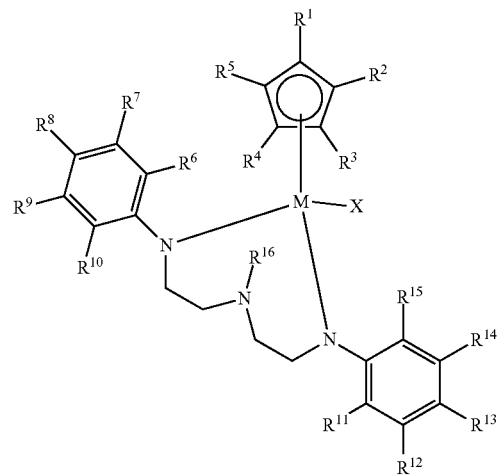

in Chemical Formula 2, $R^1$ to $R^5$ are each independently at least one selected from the group consisting of hydrogen, a C1-C10 alkyl group, an aryl group, and a C1-C10-alkylsilyl;
$R^6$ to $R^{15}$ are each independently at least one selected from the group consisting of hydrogen, halogen, a C1-C10 alkyl group, and a halomethyl group;
$R^{16}$ is selected from the group consisting of hydrogen, a C1-C10 alkyl group, and a C1-C10-alkylsilyl;
M is titanium (Ti), zirconium (Zr) or hafnium (Hf); and
X is halogen, a C1-C10 hydrocarbon group, or a hetero atom containing a C1-C10 hydrocarbon.

2. The metallocene catalyst compound of claim 1, wherein, in Chemical Formula 2, $R^1$ to $R^5$ are hydrogen.
3. The metallocene catalyst compound of claim 1, wherein, in Chemical Formula 2, any one of $R^1$ to $R^5$ is one selected from the group consisting of methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and trimethylsilyl.
4. The metallocene catalyst compound of claim 1, wherein, in Chemical Formula 2, the C1-C10 alkyl group of $R^6$ to $R^{15}$ is at least one selected from the group consisting of methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, and 5-methylhexyl.
5. A catalyst composition for olefin polymerization, comprising the metallocene catalyst compound of claim 1, an activator and a carrier.

6. The catalyst composition of claim 5, wherein the activator is at least one selected from the group consisting of borate, borane and alkylaluminoxane.

7. An olefin polymerization process comprising bringing the catalyst composition of claim 5 into contact with an olefin monomer.

8. The method of claim 7, wherein the olefin monomer is at least one selected from the group consisting of ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene and derivatives thereof.

9. The method of claim 7, wherein the olefin polymerization is performed at a polymerization temperature of 20 to 200° C. and a polymerization pressure of 10 to 7000 psig.

* * * * *